United States Patent
Lamping et al.

(10) Patent No.: US 7,877,388 B1
(45) Date of Patent: Jan. 25, 2011

(54) METHOD AND SYSTEM FOR GUIDED CLUSTER BASED PROCESSING ON PROTOTYPES

(75) Inventors: John O. Lamping, Los Altos, CA (US); Ramana Venkata, Sunnyvale, CA (US); Shashidhar Thakur, Santa Clara, CA (US); Samdeer Siruguri, Stanford, CA (US)

(73) Assignee: Stratify, Inc., Mountain View, CA (US)

( * ) Notice: Subject to any disclaimer, the term of this patent is extended or adjusted under 35 U.S.C. 154(b) by 496 days.

(21) Appl. No.: 11/931,004

(22) Filed: Oct. 31, 2007

Related U.S. Application Data

(63) Continuation of application No. 10/017,504, filed on Dec. 14, 2001, now Pat. No. 7,308,451.

(60) Provisional application No. 60/316,538, filed on Sep. 4, 2001.

(51) Int. Cl.
*G06F 7/00* (2006.01)

(52) U.S. Cl. .................. 707/737; 707/738; 707/739; 707/740

(58) Field of Classification Search .................. 707/101, 707/6, 737–740
See application file for complete search history.

(56) References Cited

U.S. PATENT DOCUMENTS

| | | | |
|---|---|---|---|
| 5,703,964 A | 12/1997 | Menon et al. |
| 5,787,394 A | 7/1998 | Bahl et al. |
| 5,787,422 A | 7/1998 | Tukey et al. |
| 5,832,182 A | 11/1998 | Zhang et al. |
| 5,864,855 A | 1/1999 | Ruocco et al. |
| 5,895,470 A | 4/1999 | Pirolli et al. |
| 5,899,995 A | 5/1999 | Millier et al. |
| 5,999,927 A | 12/1999 | Tukey et al. |
| 6,003,029 A | 12/1999 | Agrawal et al. |
| 6,055,540 A | 4/2000 | Snow et al. |
| 6,151,697 A | 11/2000 | Moeller |
| 6,154,213 A | 11/2000 | Rennison et al. |
| 6,182,066 B1 | 1/2001 | Marques |
| 6,216,134 B1 | 4/2001 | Heckerman et al. |
| 6,263,337 B1 | 7/2001 | Fayyad et al. |

(Continued)

OTHER PUBLICATIONS

Fraley et al. "How may Clusters? Which Clustering Method? Answers Via Model-Based Cluster Analysis", The Computer Journal, vol. 41, No. 8 (1998) pp. 578-588.

(Continued)

*Primary Examiner*—Apu M Mofiz
*Assistant Examiner*—Cindy Nguyen
(74) *Attorney, Agent, or Firm*—Townsend and Townsend and Crew LLP

(57) ABSTRACT

A method (and system) for clustering a plurality of items. Each of the items includes information. The method includes inputting a plurality of items. Each of the items includes information. The items are provided into a clustering process. The method also inputs an initial organization structure into the clustering process. The initial organization structure includes one or more categories, at least one of the categories being associated with one of the items. The method processes the plurality of items based upon at least the initial organization structure and the information in each of the items; and determines a resulting organization structure based upon the processing. The resulting organization structure relates to the initial organization structure.

9 Claims, 6 Drawing Sheets

U.S. PATENT DOCUMENTS

| | | | |
|---|---|---|---|
| 6,332,138 | B1 | 12/2001 | Hull et al. |
| 6,360,224 | B1 | 3/2002 | Chickering |
| 6,397,221 | B1 * | 5/2002 | Greef et al. ............... 707/102 |
| 6,446,061 | B1 | 9/2002 | Doerre et al. |
| 6,513,027 | B1 | 1/2003 | Powers et al. |
| 6,523,026 | B1 | 2/2003 | Gillis |
| 6,581,058 | B1 | 6/2003 | Fayyad et al. |
| 6,629,097 | B1 | 9/2003 | Keith |
| 6,633,882 | B1 | 10/2003 | Fayyad et al. |
| 6,671,818 | B1 | 12/2003 | Mikurak |
| 6,678,671 | B1 | 1/2004 | Petrovic et al. |
| 6,687,705 | B2 * | 2/2004 | Agrawal et al. ............ 707/101 |
| 6,725,228 | B1 | 4/2004 | Clark et al. |
| 6,766,355 | B2 | 7/2004 | Liang et al. |
| 6,778,995 | B1 | 8/2004 | Gallivan et al. |
| 6,792,545 | B2 | 9/2004 | McCreight et al. |
| 6,820,081 | B1 | 11/2004 | Kawai et al. |
| 6,829,713 | B2 | 12/2004 | Cooper et al. |
| 6,839,680 | B1 | 1/2005 | Liu et al. |
| 6,888,548 | B1 | 5/2005 | Gallivan |
| 6,892,193 | B2 | 5/2005 | Bolle et al. |
| 6,978,274 | B1 | 12/2005 | Gallivan et al. |
| 6,993,535 | B2 | 1/2006 | Bolle et al. |
| 7,035,876 | B2 | 4/2006 | Kawai et al. |
| 7,107,266 | B1 | 9/2006 | Breyman et al. |
| 7,143,091 | B2 | 11/2006 | Charnock et al. |
| 7,191,175 | B2 | 3/2007 | Evans |
| 7,271,804 | B2 | 9/2007 | Evans |
| 7,308,451 | B1 | 12/2007 | Lamping et al. |
| 7,469,246 | B1 | 12/2008 | Lamping |
| 2001/0039544 | A1 * | 11/2001 | Chakrabarti et al. ........... 707/5 |
| 2002/0080180 | A1 | 6/2002 | Mander et al. |
| 2002/0167538 | A1 | 11/2002 | Bhetanabhotla |
| 2005/0086253 | A1 | 4/2005 | Brueckner |

OTHER PUBLICATIONS

Fraley "Algorithms for Model-Based Gaussian Hierarchical Clustering" SIAM J. Sci. Comput. vol. 20, No. 1 (1998) pp. 270-281.

Iwayama et al. "Hierarchical Bayesian Clustering for Automatic Text Classification". Proceedings of the Fourteenth Intl. Joint Conference on Artificial Intelligence, vol. 2 (Aug. 1995) pp. 1322-1327.

Willett, "Document Clustering Using and Inverted File Approach", Journal of Information Science 2 (1980) pp. 223-231.

Jane and Dubes, "Clustering Methods and Algorithms", Prentice Hall (1988) QA 278, J341, Chapter 3, pp. 55-142.

Non-Final Office Action for U.S. Appl. No. 09/860,646, mailed on Aug. 30, 2004, 18 pages.

Final Office Action for U.S. Appl. No. 09/860,646, mailed on Jun. 7, 2005, 22 pages.

Non-Final Office Action for U.S. Appl. No. 09/860,646, mailed on Feb. 23, 2006, 28 pages.

Non-Final Office Action for U.S. Appl. No. 09/860,646, mailed on Jun. 19, 2007, 14 pages.

Notice of Allowance for U.S. Appl. No. 09/860,646, mailed on Feb. 27, 2008, 8 pages.

Non-Final Office Action for U.S. Appl. No. 10/017,504, mailed on Dec. 18, 2003, 13 pages.

U.S. Appl. No. 11/073,338, filed Mar. 4, 2005, Thomas et al.

Final Office Action for U.S. Appl. No. 10/017,504, mailed on May 26, 2004, 11 pages.

Advisory Action for U.S. Appl. No. 10/017,504, mailed on Nov. 2, 2004, 3 pages.

Non-Final Office Action for U.S. Appl. No. 10/017,504, mailed on May 5, 2005, 11 pages.

Final Office Action for U.S. Appl. No. 10/017,504, mailed on Jan. 11, 2006, 12 pages.

Non-Final Office Action for U.S. Appl. No. 10/017,504, mailed on Nov. 2, 2006, 14 pages.

Final Office Action for U.S. Appl. No. 10/017,504, mailed on May 7, 2007, 12 pages.

Notice of Allowance for U.S. Appl. No. 10/017,504, mailed on Aug. 3, 2007, 7 pages.

Non-Final Office Action for U.S. Appl. No. 11/073,338, mailed on Jun. 23, 2008, 30 pages.

Final Office Action for U.S. Appl. No. 11/073,338, mailed on Dec. 9, 2008, 16 pages.

Interview Summary for U.S. Appl. No. 11/073,338, mailed on Feb. 9, 2009, 2 pages.

Advisory Action for U.S. Appl. No. 11/073,338, mailed on Feb. 13, 2009, 4 pages.

Non-Final Office Action for U.S. Appl. No. 11/073,338, mailed on Apr. 2, 2009, 16 pages.

Final Office Action for U.S. Appl. No. 11/073,338 mailed Dec. 1, 2010; 20 pages.

Non-Final Office Action for U.S. Appl. No. 11/073,338 mailed May 25, 2010; 17 pages.

Final Office Action for U.S. Appl. No. 11/073,338 mailed on Oct. 27, 2010; 19 pages.

* cited by examiner

METHOD AND SYSTEM FOR GUIDED CLUSTER BASED PROCESSING ON PROTOTYPES

CROSS-REFERENCES TO RELATED APPLICATIONS

The present application claims priority from and is a continuation of U.S. application Ser. No. 10/017,504, filed Dec. 14, 2001, now U.S. Pat. No. 7,308,451, issued Dec. 11, 2007, and entitled METHOD AND SYSTEM FOR GUIDED CLUSTER BASED PROCESSING ON PROTOTYPES, which claims priority to U.S. Provisional Patent Application 60/316,538, filed on Sep. 4, 2001, the entire contents of which are herein incorporated by reference for all purposes.

BACKGROUND OF THE INVENTION

The present invention relates generally to classifying information. More particularly, the invention provides a method and system for clustering, such as clustering of documents, for analysis purposes. In a specific aspect, the present invention provides a way of classification that is to correctly associate items (e.g., documents) to be classified with one or more appropriate pre-defined categories, which define the items based upon aspects of an initial organization structure. Clustering can be used to group items into clusters, which serve as categories. Although the invention has been described in terms of documents, it has a much broader range of applicability. For example, the invention can be applied to images, DNA sequences, purchase transactions, financial records, and species descriptions.

Information should be organized to be useful. Such organization would often allow relevant information to be found when it is needed. Filing systems, such as card catalogues, are examples of information organization technology. Information is often classified by category and information about the same category is grouped together. The classification can also be recorded in an electronic system, rather than a card catalogue. Classification is valuable not only for books or other physical documents, as in the card catalogue case, but also for electronic documents, such as web pages and presentations, as well as for other kinds of items, such as images and data points. In these examples, determining the appropriate classification for information can be a challenge.

Automated classification technology can reduce the human effort otherwise required to classify items. Learning based automatic classification systems take as input a set of categories and a set of training examples, items that should belong to each category. They use the training data to build a model relating the features of an item to the categories it should belong to. They then use this model to automatically classify new items into the appropriate categories, often achieving high reliability. Techniques for performing such classification are described in Duda, R. O., & Hart, P. E. (1973). Pattern classification and scene analysis. New York, N.Y.: Wiley.

For example, a company may have collected together thousands of documents pertinent to the company, for the purpose of sharing them among the employees of the company. But employees will be much more likely to find documents of interest to them if the documents are classified by category. In this case, the items to be classified are the documents, and the categories could be a variety of categories that the documents might be about. The features of a document could be the frequency of occurrence of each of the words that occur in the document. The model could describe, for each category, typical word frequencies of documents about that category. The system would classify a new document into the category or categories with the most similar word frequencies.

These classification systems are known as supervised learning systems, because they generally attempt to reproduce the results of the training examples. A disadvantage of such systems is that they require both categories and training examples as inputs, and it may require extensive human labor to provide these categories and training examples.

An alternative to relying on training data is so call "unsupervised" approaches. For example, clustering algorithms attempt to automatically organize items into groups or a hierarchy based only on similarities of the features of the items. For example, they would group together documents with similar words. Since they do not often require training data, they require less human supplied information than classification systems. On the other hand, since they are not supervised, the clusters they find may not correspond to meaningful groupings that humans would have made. Further human intervention is typically required to understand and name resulting clusters, so they can form the basis of categorization useful to humans.

Related art for clustering can be found at Fraley, C. and A. E. Raftery, How many clusters? Which clustering method? Answers via model-based cluster analysis, Computer Journal, 41, 578—588, 1998; M. Iwayama and T. Tokunaga. Hierarchical bayesian clustering for automatic text classification. In Proceedings of the International Joint Conference on Artificial Intelligence, 1995; C. Fraley. Algorithms for model-based Gaussian hierarchical clustering. SIAM Journal on Scientific Computing, 20:270-281, 1999; Jane & Dubes, Algorithms for Clustering Data. Prentice Hall, 1988 P. Willett, Document Clustering Using an Inverted File Approach, Journal of Information Science, Vol. 2 (1980), pp. 223-31; Hofmann, T. and Puzicha, J. Statistical models for co-occurrence data. AI-MEMO 1625, Artificial Intelligence Laboratory, Massachusetts Institute of Technology (1998); 5,832,182 Zhang, et al. Method and system for data clustering for very large databases; 5,864,855 Ruocco, et al. Parallel document clustering process; 5,857,179 Vaithyanathan, et al. Computer method and apparatus for clustering documents and automatic generation of cluster keywords.

Another example of a conventional technique is described in "Learning to Classify Text from Labeled and Unlabeled Documents", Kamal Nigam, Andrew McCallum, Sebastian Thrun and Tom Mitchell. Proceedings of the 15th National Conference on Artificial Intelligence (AAAI-98). This paper shows how to combined labeled documents from a training set with unlabeled documents to create a superior training set. But the approach in the paper does not alter the starting taxonomy. It adds new documents to the starting taxonomy, but does not create new categories. In other words, it is concerned generally with improving classification by adding unlabeled items, which is limiting.

From the above, it is seen that an improved way for organizing information is highly desirable.

BRIEF SUMMARY OF THE INVENTION

According to the present invention, a technique including a method and system for clustering information is included. More particularly, the invention provides a method and system for clustering, such as automatic classification or clustering of documents, based upon an initial organization structure. In a specific aspect, the present invention provides a way of classification that is to correctly associate items (e.g., documents) to be classified with one or more appropriate predefined categories, which define the items based upon aspects of an initial organization structure. Clustering can be used to group items into clusters, which serve as categories. Although the invention has been described in terms of documents, it has a much broader range of applicability. For example, the invention can be applied to DNA sequences, purchase transactions, financial records, and species descriptions.

The technique is a method (and system) for clustering a plurality of items. The method includes inputting a plurality of items. Each of the items includes information. The items are provided into a clustering process. The method also inputs an initial organization structure into the clustering process. The initial organization structure includes one or more categories, at least one of the categories being associated with one of the items. The method processes the plurality of items based upon at least the initial organization structure and the information in each of the items; and determines a resulting organization structure based upon the processing. The resulting organization structure relates to the initial organization structure.

In a specific embodiment, the present invention, guided clustering, provides training and clustering, combining some advantages of both. In the invention, a clustering algorithm is provided with prototypical categories or a prototypical hierarchy, including training items for the prototype categories. And it is provided with additional items not present in the prototype. It uses the prototype to guide the creating of clusters or a hierarchy covering all the items. Given a coarse taxonomy, with only one or two levels, guided clustering can create a deeper, refined, taxonomy. Or given a partial taxonomy, which only covers parts of the items to be clustered, guided clustering can extend the taxonomy with additional top level categories and subcategories below them.

For example, the company with thousands of documents might have created a partial taxonomy, reflecting some of its documents and some of the categories they could be classified under. Guided clustering would extend the taxonomy with additional categories at appropriate points of the hierarchy, and would assign the documents to the extended hierarchy. In this way, the company can leverage the human effort already put into building its partial taxonomy, while also exploiting the ability of guided clustering to automatically identify additional categories not covered by the original taxonomy.

In a specific embodiment, there can be several ways in which to be guided by the prototype taxonomy. A way is to use the prototype taxonomy to influence the algorithm's judgment of what items are similar. More particularly, two items that are both similar to items in a prototype category should be judged as similar to each other, even if they do not have that many features in common. For example, a prototype category for documents about boating would have a variety of documents mentioning the words "ship", "boat", and "yacht". The algorithm would then consider a document that mentions the word "ship" to be similar to one that mentions the word "yacht", because both are similar to documents in the prototype boating category. Without the prototype, the documents would not be considered similar on the basis of those two words, because they are different words. One advantage of this technique is that the clusters produced will tend to be similar to the prototype taxonomy because items similar to items in a prototype cluster will also be similar to each other. Another advantage is that names from the prototype clusters can be used to name clusters that are created and similar to the corresponding prototype cluster.

A second way to use the prototype taxonomy is to use it as a scaffolding around which to do clustering. In this approach, the final clustering results are build out from the categories of the prototype taxonomy. The final clusters or taxonomy can include additional categories and additional structure, with the prototype taxonomy embedded in the final results. In the example above, the final taxonomy would include a boating category. It might include subcategories of boating added by clustering, such as sailing and motor boating, and it might include entirely new categories, such as skiing.

Numerous benefits are achieved over conventional techniques. For example, the present invention can be used with pre-existing organization structures, whose information is maintained. For example, a fully automatic clustering may have been performed on an initial set of documents, and the resulting organization then adjusted by human effort. If more documents are subsequently made available, the adjusted organization can be used as the prototype to guided clustering based on all the documents, to incorporate the new documents in the adjusted organization, while adding appropriate additional organization. Additionally, the present invention can provide an output that is similar to pre-existing organization structures, which are more user friendly. Further, the present invention is more likely to create new categories that are related to categories of the prototype structure, which are more likely to be of interest. Depending upon the embodiment, one or more of these benefits can be achieved. These and other benefits are described throughout the present specification and more particularly below.

The foregoing, together with other features, embodiments, and advantages of the present invention, will become more apparent when referring to the following specification, claims, and accompanying drawings.

DETAILED DESCRIPTION OF THE INVENTION

Figure 1:
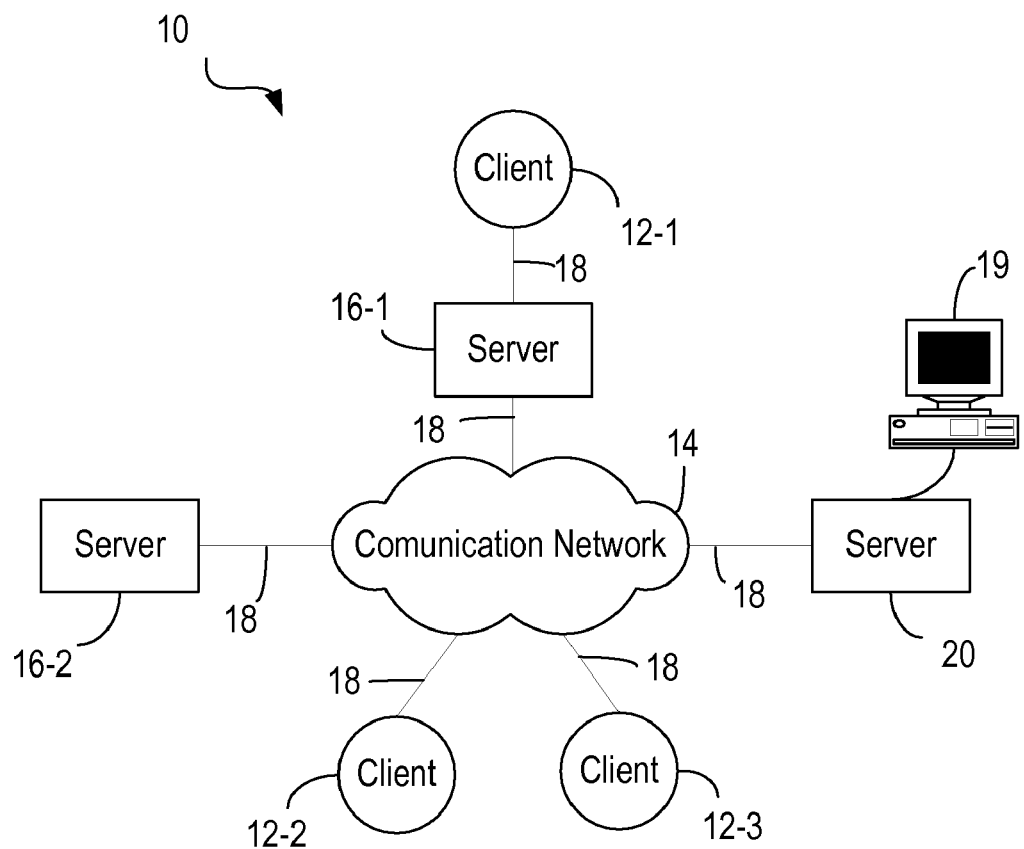
FIG. 1 is a simplified diagram of system hardware according to an embodiment of the present invention.

According to the present invention, a technique including a method and system for clustering information is included. More particularly, the invention provides a method and system for clustering, such as automatic classification or clustering of documents, based upon an initial organization structure. In a specific aspect, the present invention provides a way of classification that is to correctly associate items (e.g., documents) to be classified with one or more appropriate predefined categories, which define the items based upon aspects of an initial organization structure. Clustering can be used to group items into clusters, which serve as categories. An example of clustering is described in "METHOD AND SYSTEM FOR CLASSIFYING OR CLUSTERING ONE ITEM INTO MULTIPLE CATEGORIES" filed as U.S. Ser. No. 09/860,646, commonly assigned, and hereby incorporated by reference for all purposes. Although the invention has been described in terms of documents, it has a much broader range of applicability. For example, the invention can be applied to DNA sequences, purchase transactions, financial records, and species descriptions.

To better understand the present invention, it may be useful to define the following terms. These terms are not intended to be limiting the scope of the claims herein. They are merely provided to be illustrative, which should assist the reader in fully understanding the invention.

Clustering: This term is defined as grouping a set of objects (e.g., document, DNA sequence, purchase transaction, financial record, species description) into a set of groups (or groupings) such that the objects in a group tend to be more similar to each other than objects in another group. Other definitions for clustering include the following, which are not intended to be limiting.

"Clustering is a descriptive task associated with data mining that identifies homogeneous groups of objects in a dataset. Clustering techniques have been studied extensively in statistics, pattern recognition, and machine learning. Examples of clustering applications include customer segmentation for database marketing, identification of sub-categories of spectra from the database of infra-red sky measurements, and identification of areas of similar land use in an earth observation database. (Agrawal, et al. U.S. Pat. No. 6,003,029).

"Clustering techniques can be broadly classified into partitional techniques and hierarchical techniques. Partitional clustering partitions a set of objects into K clusters such that the objects in each cluster are more similar to each other than to objects in different clusters. For partitional clustering, the value of K can be specified by a user, and a clustering criterion must be adopted, such as a mean square error criterion, like that disclosed by P. H. Sneath et al., Numerical Taxonomy, Freeman, 1973. Popular K-means methods, such as the Fast-Clust in SAS Manual, 1995, from the SAS Institute, iteratively determine K representatives that minimize the clustering criterion and assign each object to a cluster having its representative closest to the cluster. Enhancements to partitional clustering approach for working on large databases have been developed, such as CLARANS, as disclosed by R. T. Ng et al., Efficient and effective clustering methods for spatial data mining, Proc. of the VLDB Conference, Santiago, Chile, September 1994; Focussed CLARANS, as disclosed by M. Ester et al., A database interface for clustering in large spatial databases, Proc. of the 1st Int'l Conference on Knowledge Discovery in Databases and Data Mining, Montreal, Canada, August 1995; and BIRCH, as disclosed by T. Zhang et al., BIRCH: An efficient data clustering method for very large databases, Proc. of the ACM SIGMOD Conference on Management Data, Montreal, Canada, June 1996.

Hierarchical clustering is a nested sequence of partitions. An agglomerative, hierarchical clustering starts by placing each object in its own atomic cluster and then merges the atomic clusters into larger and larger clusters until all objects are in a single cluster. Divisive, hierarchical clustering reverses the process by starting with all objects in cluster and subdividing into smaller pieces. For theoretical and empirical comparisons of hierarchical clustering techniques, see for example, A. K. Jain et al., Algorithms for Clustering Data, Prentice Hall, 1988, P. Mangiameli et al., Comparison of some neutral network and hierarchical clustering methods, European Journal of Operational Research, 93(2):402-417, September 1996, P. Michaud, Four clustering techniques, FGCS Journal, Special Issue on Data Mining, 1997, and M. Zait et al., A Comparative study of clustering methods, FGCS Journal, Special Issue on Data Mining, 1997."

"In order to cluster documents, it is necessary to first establish a pair-wise measure of document similarity and then define a method for using that measure to form sets of similar documents, or clusters. Numerous document similarity measures have been proposed, all of which consider the degree of word overlap between the two documents of interest, described as sets of words, often with frequency information. These sets are typically represented as sparse vectors of length equal to the number of unique words (or types) in the corpus. If a word occurs in a document, its location in this vector is occupied by some positive value (one if only presence/absence information is considered, or some function of its frequency within that document if frequency is considered). If a word does not occur in a document, its location in this vector is occupied by zero. A popular similarity measure, the cosine measure, determines the cosine of the angle between two sparse vectors. If both document vectors are normalized to unit length, this is of course, simply the inner product of the two vectors. Other measures include the Dice and Jaccard coefficient, which are normalized word overlap counts. Words are often replaced by terms, in which gentle stemming has combined words differing only by simple suffixes, and words on a stop list are omitted." (Tukey, et al U.S. Pat. No. 5,787,422)

Categories: This term is defined by a topic (e.g., Japan, health, finance) including a set of features with related weighing factors that define the topic.

Item: This term is defined as a collection of related information such as a document, a profile (e.g., company, personal, purchase history), history information, financial information, art and literature, credit report, Web pages, technical and/or scientific papers, legal documents, patent documents (e.g., patents, patent applications).

Feature: This term is defined as an individual instance of information of an item. For example, an occurrence of a word or words in a document is a feature.

Model: This term is defined as a characterization (e.g., mathematical) of information of features of items in a category. Examples of models include centroid feature vectors and Naïve Bayes models.

Guided: This adjective refers to using additional information in clustering beyond the information features of the items to be clustered. In particular, the additional information may be a prototype organization.

As noted and further emphasized herein, one of ordinary skill in the art would also recognize other variations, modifications, and alternatives to the definitions defined above. The definitions defined above may also have some overlap and may also be a function of other definitions. They are not intended to be an independent set of items that are unassociated with each other, although they may be in a few instances, for example. Accordingly, they are not intended to be limiting in any manner to the scope of the claims herein. Further details of the present invention are found throughout the present specification and more particularly below.

FIG. 1 is a simplified diagram of system hardware 10 according to an embodiment of the present invention. This diagram is merely an example which should not unduly limit the scope of the claims herein. One of ordinary skill in the art would recognize many other variations, modifications, and alternatives. As shown, computer network 10 includes a number of computer systems including client computer systems 12-1, 12-2, and 12-3, and web server systems 16-1 and 16-2, coupled to communication network 14 via communication links 18. Computer network 10 may also include a clustering server 20 coupled to communication network 14 via communication link 18. It should be apparent that a computer system in computer network 10 may function as a client system, a web server, an classifying server, or combinations thereof.

Communication network 14 provides a mechanism allowing the various components of computer network 10 to communicate and exchange information with each other. Communication network 14 may itself be comprised of many interconnected computer systems and communication links.

Communication links 18 may be hardwire links, optical links, satellite or other wireless communications links, wave propagation links, or any other mechanisms for communication of information. While in one embodiment, communication network 14 is the Internet, in other embodiments, communication network 14 may be any suitable computer network. Distributed computer network 10 depicted in FIG. 1 is merely illustrative of an embodiment incorporating the present invention and does not limit the scope of the invention as recited in the claims. One of ordinary skill in the art would recognize other variations, modifications, and alternatives.

Client computers 12 allows users, both human and machine, to access web pages and other information resources stored by web servers 16 coupled to communication network 14, and to access the clustering server 20. As shown in FIG. 1, client computer systems 12 may be coupled to the web servers via communication network 14, for example, client systems 12-2 and 12-3, or may alternatively be coupled directly to the server systems, for example, client system 12-1. As previously stated, a user may use a web browser executing on a client computer to access and view web pages and other information stored by web servers 16 and to request processing by clustering server 20.

Web server systems 16 store information resources which may be accessed by users of the Internet. For example, web pages stored by web servers 16 may be accessed by users using client computers 12, or by clustering server 20.

Additionally, the above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

Figure 2:
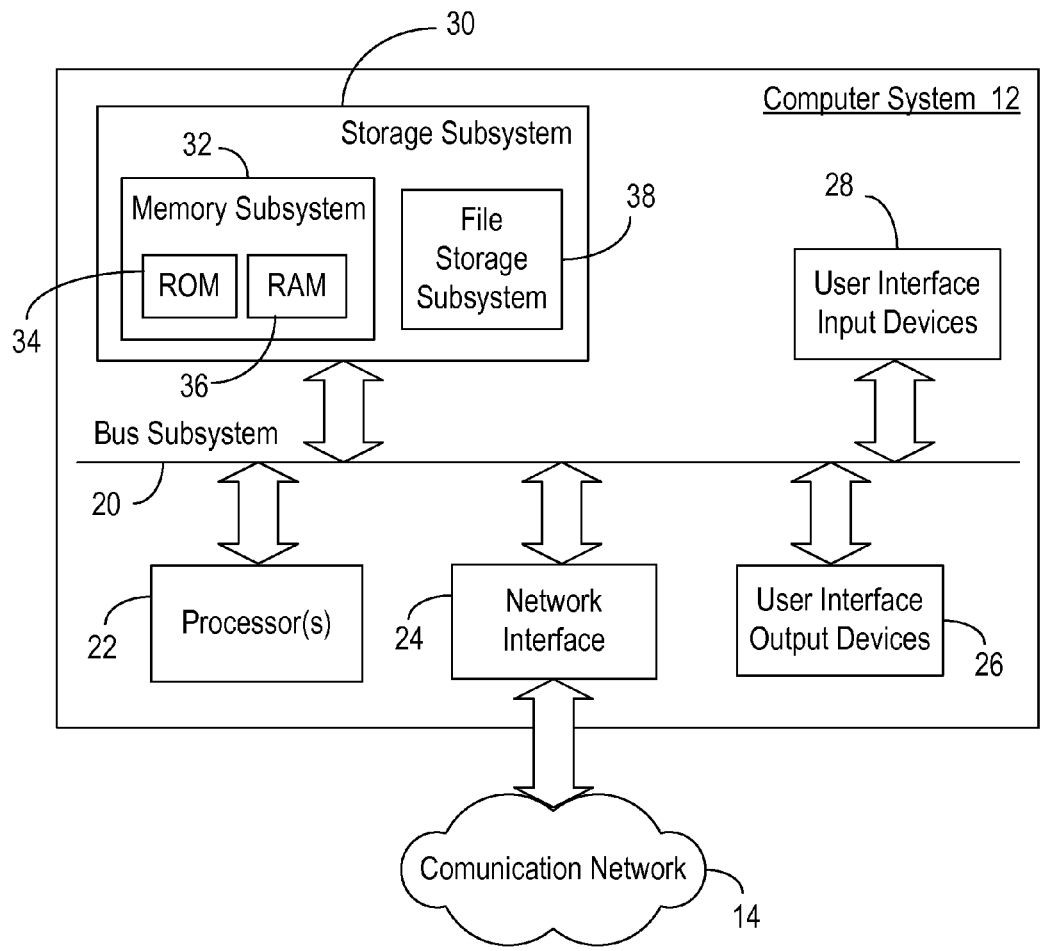
FIG. 2 is a simplified block diagram of a computer system which may be used in accordance with the present invention.

FIG. 2 is a simplified block diagram of a computer system 12 which may be used in accordance with the present invention. This diagram is merely an example which should not unduly limit the scope of the claims herein. One of ordinary skill in the art would recognize many other variations, modifications, and alternatives. Computer system 12 may function as a client system, a web server system, an clustering server system, or a combination of the aforementioned systems. Computer system 12 typically includes at least one processor 22 which communicates with a number of peripheral devices via bus subsystem 20. These peripheral devices may include a storage subsystem 30, comprising a memory subsystem 32 and a file storage subsystem 38, user interface input devices 28, user interface output devices 26, and a network interface subsystem 24. The input and output devices allow user interaction with computer system 12. Network interface subsystem 24 provides an interface to outside networks, including an interface to communication network 14, and is coupled via communication network 14 to corresponding interface devices in other client and server computer systems.

User interface input devices 28 may include a keyboard, pointing devices such as a mouse, trackball, touch pad, or graphics tablet, a scanner, a touch screen incorporated into the display, audio input devices such as voice recognition systems, microphones, and other types of input devices. In general, use of the term "input device" is intended to include all possible types of devices and ways to input information into computer system 21 or onto computer network 14.

User interface output devices 26 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 21 to the user or to another machine or computer system.

Storage subsystem 30 may be used to store the basic programming and data constructs that provide the functionality of the present invention. For example, the various modules implementing the functionality of the present invention and the browser application may be stored in storage subsystem 30. These software modules are generally executed by processor 23.

Memory subsystem 32 typically includes a number of memories including a main random access memory (RAM) 36 for storage of instructions and data during program execution and a read only memory (ROM) 34 in which fixed instructions are stored. File storage subsystem 38 provides persistent (non-volatile) storage for program and data files, and may include a hard disk drive, a floppy disk drive along with associated removable media, a Compact Digital read Only Memory (CD-ROM) drive, an optical drive, or removable media cartridges. The databases and modules implementing the functionality of the present invention may be stored by file storage subsystem 38.

Bus subsystem 20 provides a mechanism for letting the various components and subsystems of computer system 12 communicate with each other as intended. Although bus subsystem 20 is shown schematically as a single bus, alternate embodiments of the bus subsystem may utilize multiple busses.

Computer system 12 itself can be of varying types including a personal computer, a portable computer, a workstation, a computer terminal, a network computer, a television, a mainframe, or any other data processing system or user device. Due to the ever-changing nature of computers and networks, the description of computer system 12 depicted in FIG. 2 is intended only as a specific example for purposes of illustrating an embodiment of the present invention. Many other configurations of computer system are possible having more or less components than the computer system depicted in the Fig. As previously stated, computer system 12 may function as a client or server or both, although server computer systems typically have more storage capacity and computing power than client computer systems.

Figure 3:
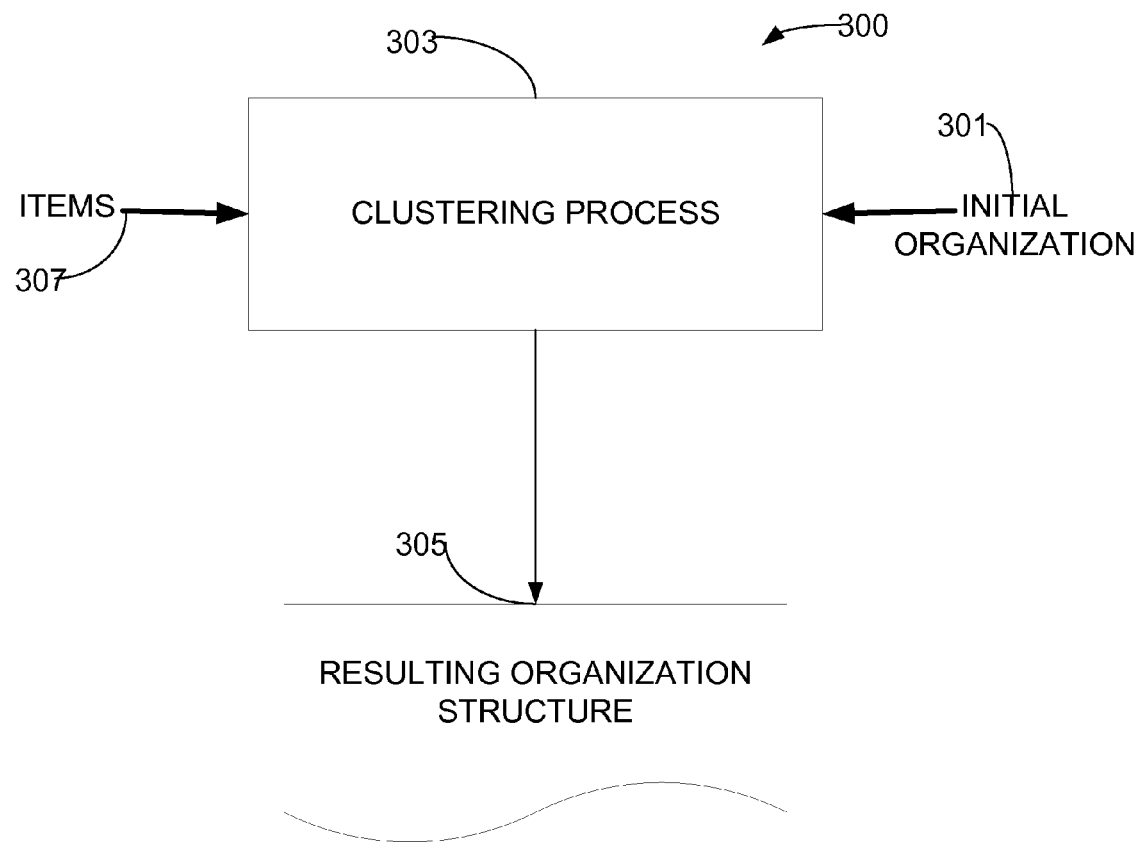
FIGS. 3 to 6 are simplified flow diagrams of an overall method according to an embodiment of the present invention.

FIG. 3 is a simplified diagram 300 of a method according to an embodiment of the present invention. These diagram is merely an example, which should not unduly limit the scope of the claims herein. One of ordinary skill in the art would recognize many other variations, modifications, and alternatives. As shown, items 307 are provided into the clustering process 303. The items can include a document, a product, a person, a DNA sequence, a purchase transaction, a financial record, a species description, or some other kind of object. An initial organization structure 301 is also provided into the process. The initial organization structure is often a structure in a conventional manner. For example, the structure can be a document hierarchy, a product family diagram, an organization diagram, a DNA sequence diagram, purchase clusters, financial record clusters, or a species taxonomy.

The clustering process receives input from at least the two items noted above. Such process yields a resulting organization structure 305. In a specific embodiment, the resulting organization structure has some likeness to the initial organization structure, but has differences. Depending upon the embodiment, there can be a "biased" clustering or "enforced" clustering or both. The biased clustering adjusts the similarity measure between items to cause items that are both similar to a category of the prototype organization to be more similar to each other. But, by itself, it imposes no constraints on the resulting organization structure. The enforced clustering ensures that the resulting organization structure is an extension of the initial organization structure. Further details of such structures are provided throughout the present specification and more particularly below.

A method according to an embodiment of the present invention can be provided as follows:

1. Input items and initial organization structure;
2. Process items and initial organization structure;
3. Cluster items from process;
4. Associate clustered items to initial organization structure; and
5. Provide a resulting organization structure based upon process, cluster, and associate steps;
6. Output the resulting organization structure; and
7. Perform other steps, as desired.

The above sequence of steps provide a way to form a resulting organization structure from an initial organization structure and input of items. The resulting organization structure is influenced in part from the initial organization structure. An example of such resulting structure is that a user of the original structure will find it more user friendly or the like. Depending upon the applications, any of the above steps can be further separated or combined with others. Additionally, the sequence of the above may be changed depending upon the application. Further details of the method are provided in the Fig. below.

Figure 4:
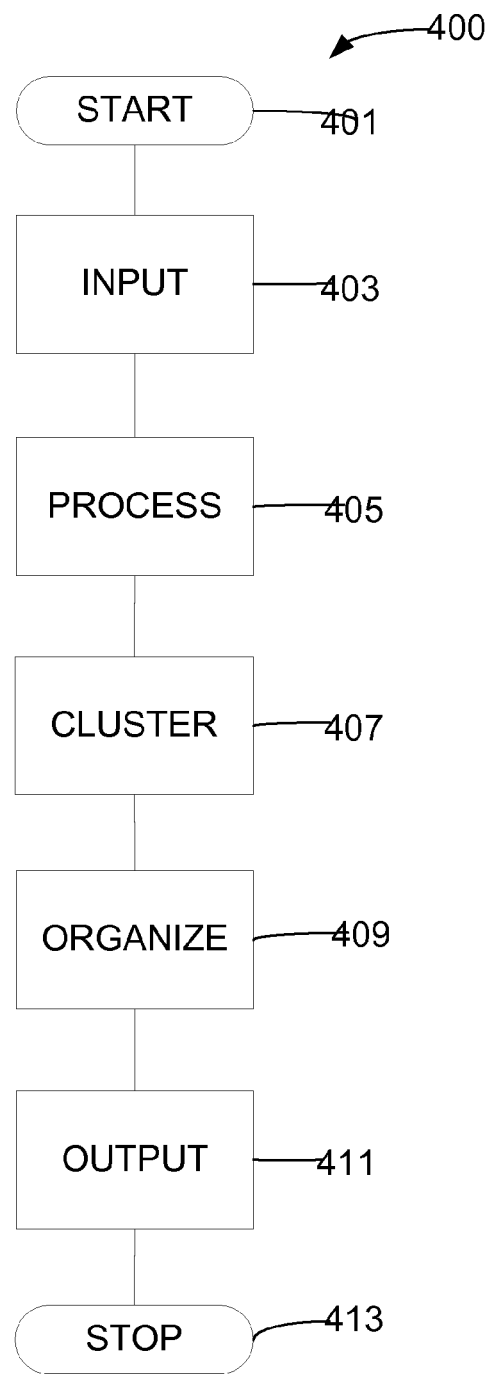
Figure 5:
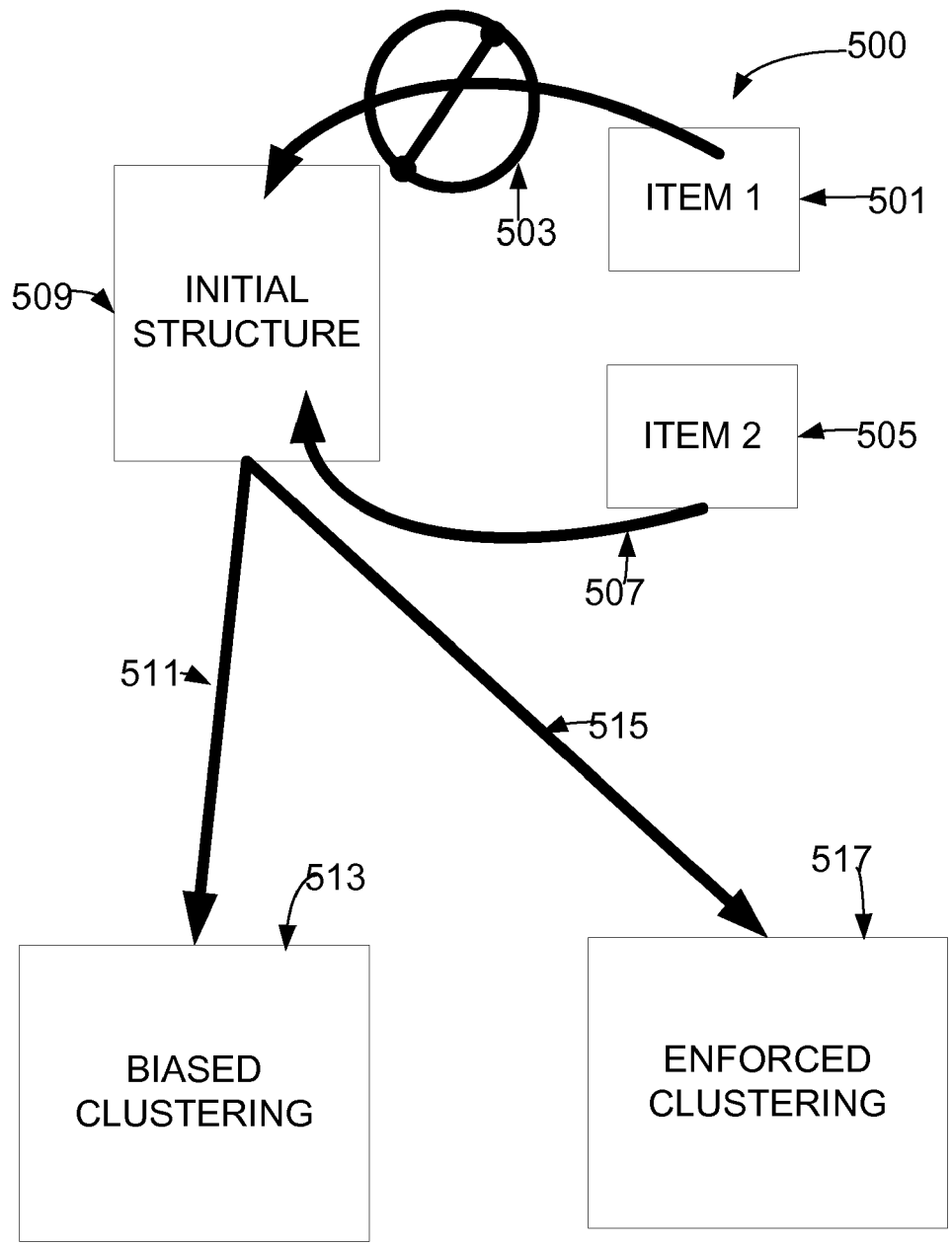
Figure 6:
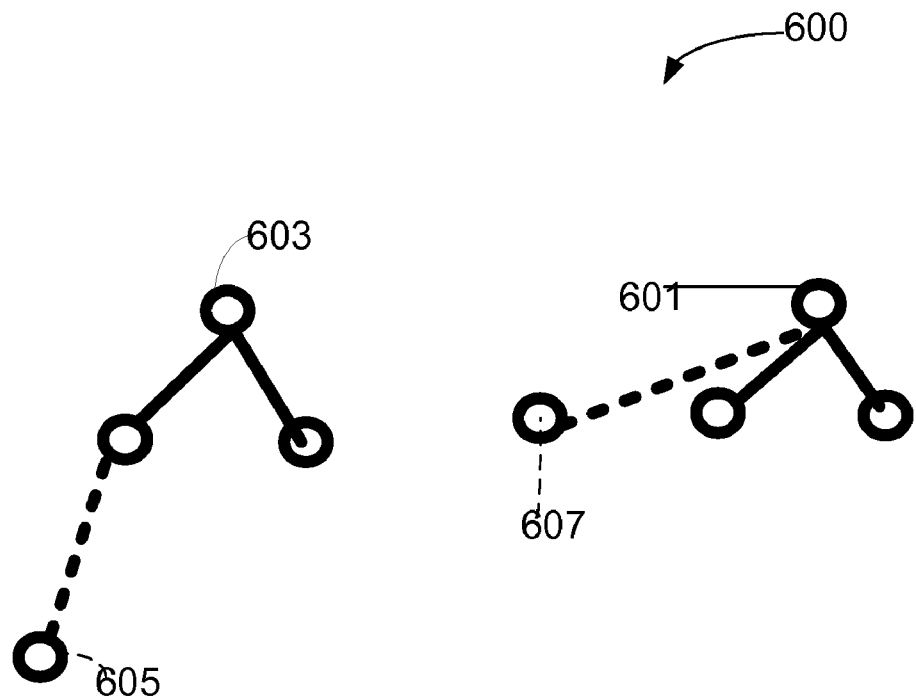

FIGS. 4 to 6 are simplified flow diagrams of an overall method according to an embodiment of the present invention. These diagrams are merely examples and should not unduly limit the scope of the claims herein. One of ordinary skill in the art would recognize many other variations, modifications, and alternatives.

As shown, the method 400 begins at start, step 401. The method is for clustering a plurality of items, each of the items including information, guided toward an initial organization structure. The method inputs a plurality of items, step 403, each of the items including information, into a clustering process, which will be described more fully below. The method also inputs an initial organization structure into the clustering process. The initial organization structure includes one or more categories, at least one of the categories being associated with one of the items.

Next, the method processes, step 405, using at least processing hardware the plurality of items based upon at least the initial organization structure and the information in each of the items in at least the clustering process. The processing hardware can be similar to the one described above, but can be others. Next, the method performs the clustering process, step 407, to form initial clusters. Here, the clustering process can include a biased clustering or enforced clustering. In a specific embodiment for biased clustering, the clustering process comprises determining a likeness level between a first item and a second item. Such likeness level between the two items increase if they are both similar to items in one or more of the categories of the initial organization structure. Preferably, the step of determining likeness includes associating a first feature vector with the first item and a second feature vector with the second item. Each feature vector represents information associated with each item. Additionally, the step of determining includes adding a first additional feature and a second additional feature to the first feature vector of the first item and the second feature vector of the second item, respectively. The first additional feature represents a first category of the initial organization structure and the second additional feature representing a second category of the initial organization structure. The first additional feature provides a degree to which the first item is similar to one or more items in the first category of the initial organization structure. A step of calculating a degree of similarity of the first item and the second item by calculating a similarity measure between the first additional feature and the second additional feature is also included. In a specific embodiment for enforced clustering, the clustering process comprises creating a cluster for each leaf category of the initial organization structure.

Next, the method organizes, step 409, the starting clusters into a hierarchy, based on the similarity of the items in the clusters. In a specific embodiment for guided clustering, the similarity measure between items includes the features added in step 407. In a specific embodiment for enforced clustering, the hierarchy is constructed so that each cluster created in step 407 for a leaf category will be placed in the hierarchy in such a way that the hierarchy will be an extension of the initial organization structure.

Based upon at least or some of the above steps, the method determines a resulting organization structure. The resulting organization structure more closely resembles the initial organization structure than if an empty organization structure or an alternative initial organization structure had been input into the clustering process. Alternatively, the resulting organization structure includes a portion of the initial organization structure and at least one additional category coupled to the initial organization structure such as in the enforced clustering process. In some embodiments, the resulting organization structure relates to the initial organization structure based upon a category similarity, a similarity of hierarchy structure, or others. In a specific embodiment, the method stores the resulting organization structure in memory, which may be fixed or temporary. The method then outputs the structure 411 on an output device such as a display, printer, etc. As shown, the method can also stop, step 413. Depending upon the embodiment, there can also be other steps, which are included in any of the above.

Further details of a method according to an embodiment of the present invention can be provided in FIG. 5. The method clusters a plurality of items, where each of the items includes information, guided toward an initial organization structure 509. The method inputs a plurality of items 501, 505, each of the items including information, into a clustering process. The method also inputs the initial organization structure 509 into the clustering process. The initial organization structure includes one or more categories, at least one of the categories being associated with one of the items.

Preferably, the method can input an item such as item 1 501, which cannot 505 be associated with any categories in the initial structure. The method can also input 507 an item such as item 2 505, which can be associated with one of the categories of the initial structure. The method creates resulting organization structures based upon the items and categories in the initial structure. Such resulting structure can include both item 1 and item 2 type items. As merely an example, the method can add an additional category 605, 607 to an initial organization structure 601, 603, as shown in FIG. 6.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

Since the invention is practiced in the context of clustering, we first present an overview of some standard clustering techniques. These techniques are intended to be purely illustrative, and the patent is not limited to clustering using only these techniques.

Clustering makes decisions based on features of the items to cluster. As mentioned above, for documents, the features are typically the words that occur in the document and their frequency of occurrence. It is common to treat the features as a vector in a high dimensional space, with one dimension for each possible feature.

In the case of documents, the space would have one dimension for each possible word in the document, and the value along a dimension would be a function of the number of times the word occurs in the document. For example, dimension 57 might correspond to the word "boat", and the 57th dimension of the vector would reflect the number of times the word "boat" occurred in the document. Often, so called "stemming" is used to treat variant forms of a word if they were the same word, so that occurrences of "boat", "boats", and "boater" would all be reflected in the 57th dimension.

For documents, the value of a dimension is often set to be proportional to the total number of occurrences of the word corresponding to that dimension. It has also been suggested to set the value proportional to the square root of the total number of occurrences of the word. Frequently, an additional weighting is added to make occurrences of rare words more important. For example, the so-called TF-IDF weighting sets the value of a dimension proportional to the number of occurrences of the word corresponding to that dimension times the negative of the logarithm of the fraction of documents that have occurrences of that word. In these cases, the constant of proportionality is typically set so that the total Euclidean length of the feature vector is 1. Since most documents will mention only a small fraction of the possible words, the vectors will be sparse, with 0's in most dimensions.

One common technique of clustering is the so-called K-means algorithm. This approach starts by choosing K starting feature vectors, where K is the number of clusters desired. For example, the starting vectors could be the feature vectors associated with K randomly selected items. Then each item is associated with the nearest of the K feature vectors, thus forming K clusters, each consisting of those items closest to one of the K starting feature vectors. "Nearest" in this case is commonly taken to be the feature vector with the largest dot product with the item's feature vector. This identifies the feature vector pointing in the most similar direction. Other definitions of closeness are sometimes used, as described in the referenced articles.

A revised feature vector is then calculated for each cluster by taking the average of the feature vectors of the items assigned to that cluster. The revised feature vectors may then be scaled so that their Euclidean length is 1. The items are now re-assigned to clusters, based on the revised feature vectors. Since the K feature vectors have changed, that may result in a different assignment of items to clusters. If so, the feature vectors are recomputed again, and the process repeated until there are no more changes in the assignment of items to clusters or some other termination criterion is met. The result is K clusters of similar items.

The K-means algorithm produces clusters, but not a hierarchical organization. Another technique of clustering, which can produce a hierarchy, is hierarchical agglomerative clustering, or HAC. Given a set of items, HAC produces a tree of successively finer clusters, where each non-leaf node of the tree has exactly two children. It does this "bottom-up", starting by grouping similar items, and then grouping successively larger groups.

HAC starts by creating a cluster for each item, with the features of each cluster being the same as the features of its item. Then it identifies the two clusters that are closest to each other, using the same kind of closeness measure as K-means. It combines those two clusters into a larger cluster, with the two close clusters as its children. It takes the average of the feature vectors of the close clusters to be the feature vector of the new cluster. It now removes the two close clusters from consideration, but adds the new cluster to consideration. It repeats this process until there is only one clusters left. At this point, it will have constructed a binary tree, the remaining cluster as its root and with single item clusters at the leaves.

It is also possible to combine an algorithm, like K-means, that produces clusters but not a hierarchy with HAC to produce a hierarchy where the leaves are clusters produced by the clustering algorithm. In this case, the clustering algorithm is first run to produce a set of clusters. Then HAC is run on those clusters to produce the hierarchy.

One aspect of the invention is to adjust the similarity measure used by a clustering algorithm to better align it with a prototype set of clusters or hierarchy. It makes two items more similar if they are each similar to one or more prototype clusters. In the preferred embodiment, this is accomplished by adjusting the feature vectors of the items, which will then influence the similarity of items. It adjusts the features vectors so that directions for features that co-occur in clusters are somewhat aligned, rather than purely orthogonal. The technique accomplishes this by introducing an artificial feature corresponding to each of the prototype clusters. It then moves some of the weight of each actual feature to the artificial cluster features of those clusters suggested by the feature.

For example, in clustering documents, suppose there was a boating cluster. The technique introduces a new feature "boating". Assume the boating cluster had documents with the words "boat", "ship", and "yacht", and those words occur more frequently in documents in the boating cluster than in documents in other clusters. The technique transfers some of the weight of each of those words in a feature vector to the new "boating" feature. This will cause a document that mentioned only "boat" to become similar to a document that mentioned only "yacht", because each would now have the "boating" feature in common.

There are a number of formulas that will achieve this result. We now describe the preferred embodiment for the case where the prototype consists of clusters, but not of a hierarchy. In the preferred embodiment, the similarity measure between two items is the so-called cosine measure, the dot product of their feature vectors. The following adjustment formula can also be used with other measures of similarity as well, however.

Let $Fn(i)$ be the value of feature n on item i.

Let $Fc(i)$ be the value of the artificial feature for prototype cluster c on item i.

Let I be the set of all items in all prototype clusters.

Let P be the set of prototype clusters.

We assume that the feature vectors are of unit Euclidian length, that is, that for all i in I, the sum of $Fn(i)^2$ over all features n, equals 1.

For any set of items, C, define $N(C)$=the number of items in C.

Calculate $Fn^2(C)$=the sum of $Fn(i)^2$ for all $i$ in $C$, divided by $N(C)$.

Calculate $Var(Fn^2)$=(the sum of $N(C)Fn^2(C)^2$ for all $C$)–$N(I)Fn^2(I)^2$), divided by $N(I)$–1.

Calculate $Tn(C)=N(C)(Fn^2(C)-Fn^2(I))^2/(N(I)Var(Fn^2))$.

Here, Tn(C) is the fraction of amplitude of Fn that will be added to Fc, the artificial feature corresponding to concept C. The formula for Tn(C) will be seen to be approximately equal to the amount of variation in $Fn(i)^2$ that can be explained by the excess occurrences of Fn among the items in C.

Given the coefficients Tn(C), compute a new feature vector F'n(i) for each item i, as follows:

Calculate $T$=the sum of $Fn(i)^2Tn(C)$ for all $n$ for all $C$

Calculate $F'n(i)=Fn(i)$ divided by the square root of $(1+T)$.

Calculate $F'c(i)$=the square root of (the sum of $Fn(i)^2Tn(C)$ for all $n$, divided by $(1+T)$).

It will be seen that this formula preserves the Euclidian length of the vector.

Given these formulas, the procedure for computing adjusted features of items to reflect prototype clusters is:

Zero accumulators $An^2(C)$ for all n and C
Zero accumulators $An^2(I)$ for all n
Zero accumulators $Vn^2(I)$ for all n
For each prototype item, i:
For each n: add $Fn(i)^2$ to $An^2(C)$, where C is the prototype cluster containing i add $Fn(i)^2$ to $An^2(I)$ Calculate $Fn^2(C)=An^2(C)/N(C)$ for all $n$ and $C$.

Calculate $Fn^2(I)=An^2(I)/N(C)$ for all $n$.

For each prototype cluster C: add $N(C)Fn^2(C)^2$ to $Vn^2(I)$

Calculate $Var(Fn^2)=(Vn^2(I)-N(I)Fn^2(I)^2)/(N(I)-1)$ for all $n$.

Calculate $Tn(C)=N(C)(Fn^2(C)-Fn^2(I))^2/(N(I)Var(Fn^2))$ for all $n$ and $C$.

For each item, i:
Zero accumulators A'c for all C
Add $Tn(C)Fn(C)^2$ to A'c for all n and C
Zero accumulator T
Add A'c to T for all C Calculate $F'n(i)=Fn(i)$ divided by the square root of $(1+T)$ for all $n$.

Calculate $F'c(i)$=the square root of $(A'c/(1+T))$

If the prototype is a hierarchy of clusters, and not just a flat list of clusters, then the formula for Tn(C) in the preferred embodiment is adjusted to compare to the parent's distribution:

$Tn(C)=N(C)(Fn^2(C)-Fn^2(P(C)))^2/(N(I)Var(Fn^2))$

Where P(C) is the parent of cluster C in the hierarchy. In the computation of $Fn^2(C)$ for a cluster with children, the summation runs over all the items of each of its descendants, as well as items directly contained in the cluster C.

Once the revised feature vectors have been calculated, they are used in place of the original feature vectors in the clustering algorithm. The clustering algorithm can be any clustering algorithm that relies on feature vectors. For example, it could be K-means or HAC or a combination of those two, or any of the other algorithms described in the references.

Once the clusters have been created, the added cluster features can be used to help provide names to the resulting clusters. For each prototype cluster, C, the cluster with the largest total of F'c among the features of the items assigned directly to that cluster can be assigned the name associated with the prototype cluster.

In some circumstances, various refinements to the above formulas may be appropriate.

If some prototype clusters have very few items, they may show features due to randomness, rather than to that feature being associated with the cluster. This can be counteracted by smoothing the features during the computation. For example, in computing $An^2(C)$, the largest feature value contributing to the sum can be omitted. This will have the effect of eliminating the effect of isolated feature occurrences, while not significantly affecting clusters with significant amount of feature occurrences.

If feature values are sparse, that is, if items typically have few non-zero feature values, then adding new features for all the F'c features could significantly increase the total number of features per item, increasing computational time and storage requirements. In this case, the number of F'c features added to any item can be limited. For example, only the 20 F'c features with the largest values can be added. In this case, only those c's are considered in the above step.

Add $Tn(C)Fn(C)^2$ to A'c for all n and C

Other formulas than the preferred formula are possible. For example, the feature vector for an item can be projected onto the subspace spanned by the averages of the feature vectors of the prototype clusters. The projection can be added back to the feature vector and the result normalized to unit length. This transformation emphasizes features that occur prominently in clusters. A similar such transformation is to use the formula of the preferred embodiment, but set F'n(i)=Fn(i), so that weight is not moved from features to artificial features, but instead simple added to artificial features. The F' feature vector is then normalized before being used.

The above formulas work best when the dimensionality of the feature space is comparable to the number of prototype clusters, or larger. When the dimensionality of the feature space is smaller than the number of prototype clusters, it may be more effective to add artificial features to an item corresponding to the nearest few prototype clusters.

The previous aspect of the invention gives clustering a bias in the direction of the prototype clusters or hierarchy. But it does not guarantee that the resulting clusters resemble the prototype. Another aspect of the invention provides such a guarantee.

While there are several possible such guarantees, the guarantee of the preferred embodiment is that the output clusters or hierarchy will be an extension of the prototype clusters or hierarchy. We say that a cluster structure, B, is an extension of another structure, A, if B can be transformed into A by any combination of the operations:

1. Remove an item from a cluster
2. Remove a cluster, making any children or items that had belonged to the cluster now belong to the former cluster's parent.

Put another way, an extension is created from a prototype cluster structure by adding items, adding clusters, and interposing clusters between a cluster and some of its children and items.

The preferred embodiment of this aspect is to do a HAC algorithm, constrained to create an extension of the original structure. The HAC algorithm will start will one cluster for each item, including both items in the prototype clusters or hierarchy and items not in the prototype. HAC will run in the usual way, at each step combining the closest two clusters, except that it will not combine clusters that would result in a non-extension of the prototype hierarchy. In addition, other similarity scores may be adjusted, as described below, to yield a better hierarchy.

HAC builds a tree bottom-up, and must reconstruct the prototype hierarchy or clusters as part of that process. Combinations inconsistent with the prototype hierarchy must be forbidden. Clusters that don't contain any items from the prototype are not constrained. Combining with them can never result in a non-extension. Combination is only forbidden between two clusters that both contain prototype items. Any cluster that contains prototype items will correspond to a given part of the prototype hierarchy, and must only be combined with other such clusters when they correspond to adjacent parts of the prototype hierarchy.

Formally, define the progenitor of a cluster to be the lowest prototype cluster in the prototype hierarchy that contains all prototype items that are contained in the given cluster. Define a cluster to be complete if it contains all the items of its progenitor. Define the target of a cluster that is not complete to be its progenitor, and the target of a complete cluster to be the parent prototype cluster of its progenitor. Define two clusters to be compatible if either has no prototype items, or if both have the same target. For the purpose of these definitions, if the prototype does not have a single root cluster, add a root cluster to the prototype, with all prototype clusters that don't have parents as its children.

It suffices to run a HAC algorithm with the modification that clusters that are not compatible are not combined. After HAC finishes, for each prototype cluster, the highest cluster in the HAC hierarchy that has that prototype cluster as progenitor is labeled as being associated with the prototype cluster.

A procedure for this adjusted HAC is:
Set the candidate clusters to contain one cluster for each item.
Set the output clusters to the candidate clusters.
While there is more than one candidate cluster:
Find the two closest clusters that are also compatible.
Create a new cluster with the two closest clusters as its children.
Set the features of the new cluster to be the weighted average of the features of the two clusters, weighted by the number of items each covers.
Remove the two closest clusters from the candidate clusters.
Add the new cluster to the candidate clusters.
Add the new cluster to the output clusters.
For each prototype cluster:
Find the highest output cluster that has the prototype cluster as progenitor.
Label that cluster as being associated with the prototype cluster.

The preferred embodiment requires a refinement to this procedure, however. It accelerates the combination of clusters that are preventing other good combinations from taking place. Consider a situation in HAC that includes three clusters, A, B, and C. Assume that A and B have the same target, and that their combination would be complete. Assume that C's target is the parent of A's and B's target. Further, assume that A is quite small and not very similar to B, but that B is quite similar to C. Despite their similarity, B cannot combine with C because they are not compatible; the guarantee requires that B must combine with A first. The best output hierarchy is probably one where A and B are combined into a new cluster, AB, and then AB is combined with C. This is because the guarantee requires that A and B be combined in the final output, even though the have low similarity, and, further, because AB is probably quite similar to C, since B is similar to C and A is not big enough to significantly affect the combination of A and B.

Unfortunately, the above algorithm is unlikely to produce this result. Since A and B are not very similar, they will not combine until a much later stage of the HAC algorithm, and so B will not participate in any other combinations until much later. It is very likely that C will instead be combined with some other cluster before cluster AB is ever produced, resulting in an inferior hierarchy.

To address this problem, we advance the combination of A and B, since they will have to be combined eventually, so that the combination with C can be facilitated. We achieve this by tentatively entertaining the idea of combining B and C, then noticing that that combination is blocked because B must combine with another cluster first, and giving a boost to the combination of B with the cluster is must combine with, A. As in this example, the general situation will always be that one cluster would like to combine with another, but can't do so until it combines with enough other clusters to become complete. We advance its combination with those other clusters.

To implement this, additional definitions and information about a cluster is needed. Define two clusters to be akin if they are compatible or if the progenitor of one is the parent of the progenitor of the other, or if the parents of each of their progenitors are the same. Give each cluster a blocked flag, a boost weight, and a boost similarity. The blocked flag will indicate that the algorithm would like to combine cluster with another, but can't until the cluster combines with more clusters to become complete. Non zero values for boost weight and boost similarity indicate this cluster needs to combine with another cluster before that cluster can combine with its preferred mate, and they indicate how eagerly to advance this cluster's combinations.

The procedure now becomes:
Set the candidate clusters to contain one cluster for each item.
Set the output clusters to the candidate clusters.
While there is more than one candidate cluster:
Set the blocked flag of each cluster to false.
Set the boost similarity and boost weight of each cluster to false.
Repeat:
For each pair of clusters:
Set the similarity of the pair to the similarity as computed from their features.
If one of the clusters has a boost weight and its boost similarity is greater than the computed similarity then set the similarity of the pair to be the weighted average of its computed similarity and the cluster's boost similarity, weighted by the number of items covered by the other cluster and by the cluster's boost weight, respectively.
Find the two closest clusters, under the revised similarity, that are also akin and that are not either marked blocked.
If they are not compatible, for each of those two clusters that is not complete:
Mark the cluster as blocked.
For each cluster with the same target as the blocked cluster:
If its boost weight is less than the number of items covered by the blocked cluster:
Set its boost weight to the number of items covered by the blocked cluster.
Set its boost similarity to the revised similarity between the two clusters.

Continue the above repetition until the two closest clusters are compatible.

Create a new cluster with the two closest clusters as its children.

Set the features of the new cluster to be the weighted average of the features of the two clusters, weighted by the number of items each covers.

Remove the two closest clusters from the candidate clusters.

Add the new cluster to the candidate clusters.

Add the new cluster to the output clusters.

For each prototype cluster:

Find the highest complete output cluster that has the prototype cluster as progenitor.

Label that cluster as being associated with the prototype cluster.

While this procedure describes the preferred embodiment, other embodiments are possible. For example, the definition of "akin" could be altered to include clusters that are more distantly related, or even to include all pairs of clusters. Also, the formula for computing the boost in similarity can be altered. It is important, however, for the convergence of the algorithm, for the boosted similarity to never exceed the similarity between the clusters whose combination was blocked.

It will be evident to one skilled in the art that some of the computations in the above algorithm can be re-used between iterations of the algorithm.

Yet another embodiment uses a combination of K-means and HAC. It creates initial clusters using a K-means algorithm. It creates additional initial clusters for each of the prototype clusters. It then applies the above algorithm to those initial clusters. After the above algorithm has completed, each prototype item will be in two leaf clusters, one created by K-means and one copied from the prototype. Each such item is moved to the most similar cluster among those that are descendants of the hierarchy cluster labeled as associated with its prototype cluster.

In this alternative embodiment, it may also be advantageous, when some of the prototype clusters have very few items, to make a further alteration of the similarity estimate. In this case, the items might not provide a representative sample of the intended category corresponding to the cluster. To mitigate this problem, the calculated similarity between an initial cluster that derived from a prototype cluster and another initial cluster can be reduced in proportion to the ratio of the number of items in the prototype cluster compared to the minimum number of items expected in a full size prototype cluster. For example, the minimum number of expected items might be 10.

In order to prove the principles and operation of the invention, we have implemented many if not all of the aspects above using computer hardware and software. As merely an example, we used a C++ computer language on a Windows NT™ operating system manufactured and sold by Microsoft Corporation of Redmond, Wash. The hardware included a Intel based Pentium III™ processor, which was manufactured by Intel Corporation of Santa Clara, Calif. The items included information from Web pages, which were taken off of Internet. It would be recognized that there could be many other variations, modifications, and alternatives. These and other variations would be recognized by one of ordinary skill in the art.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method comprising:
    receiving, by a computer system, a first hierarchy including at least a first category and a second category that is a child of the first category;
    receiving, by the computer system, a plurality of items, each of the plurality of items including information, at least one of the items being associated with one of the categories in the first hierarchy;
    processing, by the computer system, the plurality of items in a clustering process based upon at least the first hierarchy and the information in each of the items, wherein the processing comprises:
        forming a tentative cluster from at least two of the items;
        determining whether the tentative cluster is consistent with an extension of the first hierarchy; and
        rejecting the tentative cluster in the event that the tentative cluster is inconsistent with an extension of the first hierarchy;
    automatically determining, by the computer system, a second hierarchy based upon the processing, the second hierarchy including a portion of the first hierarchy and one or more additional categories coupled to the first hierarchy, at least one of the one or more additional categories being a sibling of the second category of the first hierarchy;
    storing the second hierarchy in memory; and
    assigning each of the plurality of items to a category of the second hierarchy.

2. The method of claim 1 wherein the clustering process guarantees that the second hierarchy is an extension of the first hierarchy.

3. The method of claim 1 wherein the first hierarchy further includes a third category and a fourth category that is a child of the third category, and wherein the processing includes interposing a new category between the third category and the fourth category.

4. A computer-readable storage medium having stored thereon program code executable by a processor, the program code comprising:
    code that causes the processor to receive a first hierarchy including at least a first category and a second category that is child of the first category;
    code that causes the processor to receive a plurality of items, each of the plurality of items including information, at least one of the items being associated with one of the categories in the first hierarchy;
    code that causes the processor to process the plurality of items in a clustering process based upon at least the first hierarchy and the information in each of the items, wherein the code that causes the processor to process the plurality of items in a clustering process includes:
        code that causes the processor to form a tentative cluster from at least two of the items;

code that causes the processor to determine whether the tentative cluster is consistent with an extension of the first hierarchy; and code that causes the processor to reject the tentative cluster in the event that the tentative cluster is inconsistent with an extension of the first hierarchy;

code that causes the processor to automatically determine a second hierarchy based upon the processing, the second hierarchy including a portion of the first hierarchy and one or more additional categories coupled to the first hierarchy, at least one of the one or more additional categories being a sibling of the second category of the first hierarchy;

code that causes the processor to store the second hierarchy in memory; and code that causes the processor to assign each of the plurality of items to a category of the second hierarchy.

5. The computer-readable storage medium of claim 4 wherein the clustering process guarantees that the second hierarchy is an extension of the first hierarchy.

6. The computer-readable medium of claim 4 wherein the first hierarchy further includes a third category and a fourth category that is a child of the third category, and wherein the processing includes interposing a new category between the third category and the fourth category such that the new category is a child of the third category and a parent of the fourth category in the second hierarchy.

7. A computer system comprising:

a processor configured to:

receive a first hierarchy including at least a first category and a second category that is a child of the first category;

receive a plurality of items, each of the plurality of items including information, at least one of the items being associated with one of the categories in the first hierarchy;

process the plurality of items in a clustering process based upon at least the first hierarchy and the information in each of the items, wherein the processing comprises:

forming a tentative cluster from at least two of the items;

determining whether the tentative cluster is consistent with an extension of the first hierarchy; and rejecting the tentative cluster in the event that the tentative cluster is inconsistent with an extension of the first hierarchy;

automatically determine a second hierarchy based upon the processing, the second hierarchy including a portion of the first hierarchy and one or more additional categories coupled to the first hierarchy, at least one of the one or more additional categories being a sibling of the second category of the first hierarchy;

storing the second hierarchy in memory; and assigning each of the plurality of items to a category of the second hierarchy.

8. The computer system of claim 7 wherein the clustering process guarantees that the second hierarchy is an extension of the first hierarchy.

9. The computer system of claim 7 wherein the first hierarchy further includes a third category and a fourth category that is a child of the third category, and wherein the processing includes interposing a new category between the third category and the fourth category.

\* \* \* \* \*